(12) United States Patent
Dralle

(10) Patent No.: US 9,873,075 B2
(45) Date of Patent: Jan. 23, 2018

(54) HIGH EFFICIENCY PAINT ARRESTANCE FILTER

(71) Applicant: A.J. Dralle, Inc., Joliet, IL (US)

(72) Inventor: James R. Dralle, Lemont, IL (US)

(73) Assignee: A.J. Dralle, Inc., Joliet, IL (US)

(*) Notice: Subject to any disclaimer, the term of this patent is extended or adjusted under 35 U.S.C. 154(b) by 15 days.

(21) Appl. No.: 15/087,645

(22) Filed: Mar. 31, 2016

(65) Prior Publication Data

US 2016/0214049 A1 Jul. 28, 2016

Related U.S. Application Data

(62) Division of application No. 14/290,522, filed on May 29, 2014, now Pat. No. 9,327,227, which is a division of application No. 13/187,216, filed on Jul. 20, 2011, now Pat. No. 8,764,871.

(51) Int. Cl.
*B01D 46/00* (2006.01)
*B01D 46/02* (2006.01)
*B01D 46/10* (2006.01)

(52) U.S. Cl.
CPC ....... *B01D 46/023* (2013.01); *B01D 46/0001* (2013.01); *B01D 46/0023* (2013.01); *B01D 46/0024* (2013.01); *B01D 46/10* (2013.01); *Y10T 29/49826* (2015.01)

(58) Field of Classification Search
CPC .............. B01D 46/0001; B01D 46/023; B01D 46/0023; B01D 46/0024; B01D 46/10
USPC .......................................................... 55/485
See application file for complete search history.

(56) References Cited

U.S. PATENT DOCUMENTS

| | | | |
|---|---|---|---|
| 3,249,228 A | 5/1966 | Savas | |
| 3,443,366 A | 5/1969 | Schwab | |
| 3,853,510 A | 12/1974 | Meyer et al. | |
| 4,356,011 A | 10/1982 | Day et al. | |
| 5,667,544 A | 9/1997 | Haas et al. | |
| 7,550,022 B2 | 6/2009 | Smith | |
| 7,779,779 B2 | 8/2010 | Ferguson et al. | |
| 7,905,974 B2 | 3/2011 | Langlands et al. | |
| 8,216,413 B2 | 7/2012 | Langlands et al. | |
| 8,679,236 B1 | 3/2014 | Dietz | |
| 8,764,871 B2 | 7/2014 | Dralle | |

(Continued)

OTHER PUBLICATIONS

"U.S. Appl. No. 13/187,216, Non Final Office Action dated Nov. 5, 2013", 11 pgs.

(Continued)

*Primary Examiner* — Robert Clemente
(74) *Attorney, Agent, or Firm* — Schwegman Lundberg & Woessner, P.A.

(57) ABSTRACT

Various examples of the inventive subject matter include a method and corresponding system for fabricating a combination paint arrestance filter for use in the painting industry. Embodiments of the system include a single-stage combination filter having a number of first layer media pockets and a number of second layer media pockets arranged downstream of the first layer pockets. An opening of each of the first layer media pockets is arranged in parallel with one another to receive an incoming airflow into the single-stage combination filter. Each of the second layer media pockets is at least 99.97% efficient at removing 0.3 micron and larger particles at a face velocity on the filter of about 37 meters per minute.

6 Claims, 12 Drawing Sheets

(56) References Cited

U.S. PATENT DOCUMENTS

| | | |
|---|---|---|
| 9,327,227 B2 | 5/2016 | Dralle |
| 2007/0056256 A1 | 3/2007 | Tepper et al. |
| 2008/0026041 A1 | 1/2008 | Tepper et al. |
| 2009/0031682 A1 | 2/2009 | Langlands et al. |
| 2012/0272632 A1 | 11/2012 | Lans |
| 2013/0000264 A1* | 1/2013 | Kearsley .............. B01D 46/023 55/341.1 |
| 2013/0019578 A1 | 1/2013 | Dralle |
| 2014/0260128 A1 | 9/2014 | Dralle |
| 2016/0214050 A1 | 7/2016 | Dralle |

OTHER PUBLICATIONS

"U.S. Appl. No. 13/187,216, Notice of Allowance dated Feb. 21, 2014", 8 pgs.

"U.S. Appl. No. 13/187,216, Response filed Feb. 5, 2014 to Non Final Office Action dated Nov. 5, 2013", 9 pgs.

"U.S. Appl. No. 13/187,216 Response filed Oct. 23, 2013 to Restriction Requirement dated Sep. 24, 2013", 8 pgs.

"U.S. Appl. No. 13/187,216, Restriction Requirement dated Sep. 24, 2013", 9 pgs.

"U.S. Appl. No. 14/290,522, Non Final Office Action dated Aug. 28, 2015", 8 pgs.

"U.S. Appl. No. 14/290,522, Notice of Allowance dated Feb. 12, 2016", 7 pgs.

"U.S. Appl. No. 14/290,522, Response fled Nov. 30, 2015 to Non Final Office Action dated Aug. 28, 2015", 6 pgs.

"U.S. Appl. No. 15/087,705, Non Final Office Action dated Jun. 5, 2017", 6 pgs.

"U.S. Appl. No. 15/087,705, Response filed Sep. 5, 2017 to Non Final Office Action dated Jun. 5, 2017", 6 pgs.

\* cited by examiner

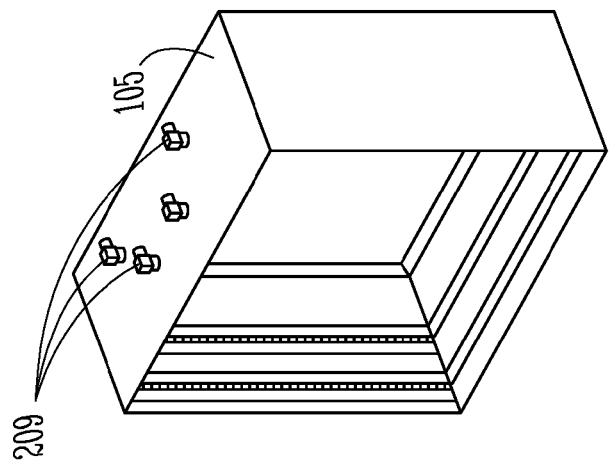
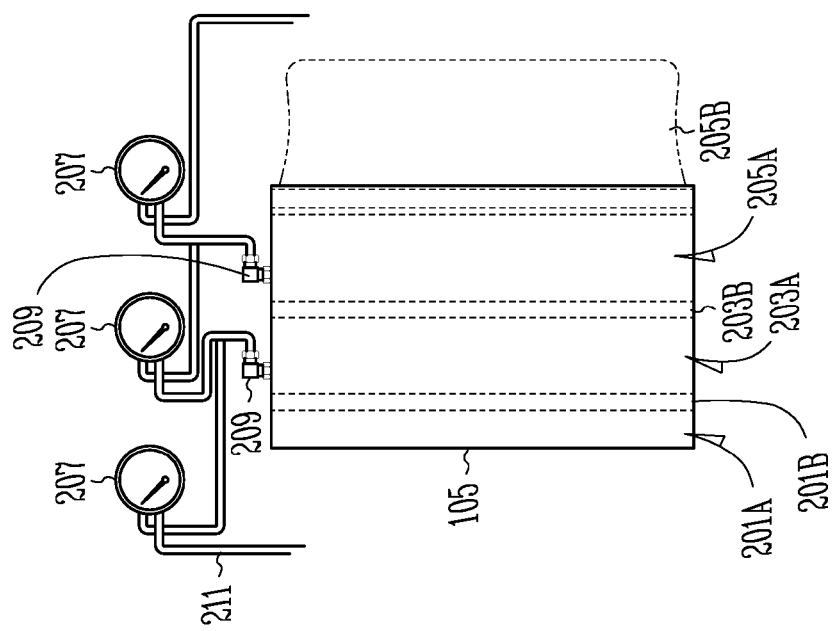

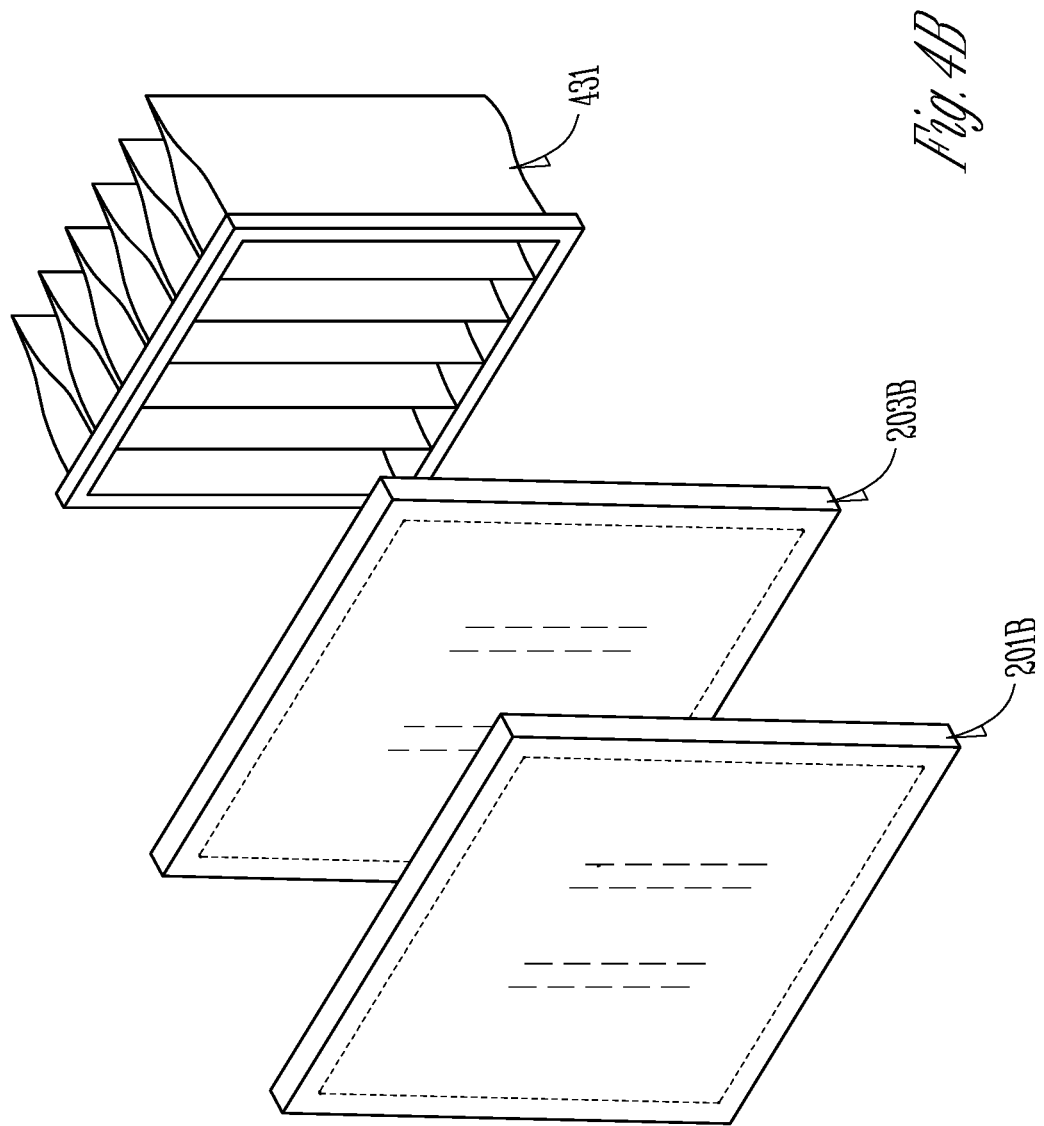

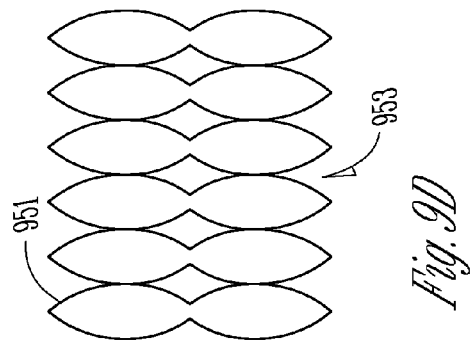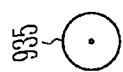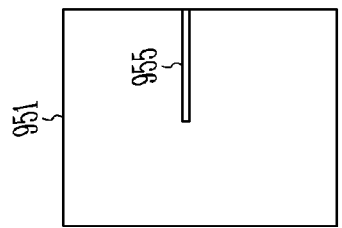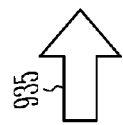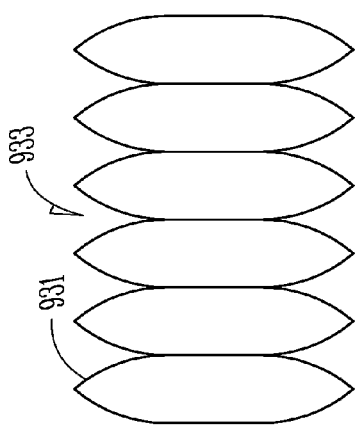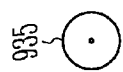

HIGH EFFICIENCY PAINT ARRESTANCE FILTER

RELATED APPLICATION

This application is a divisional of U.S. patent application Ser. No. 14/290,522, filed May 29, 2014, which is a divisional of U.S. patent application Ser. No. 13/187,216, filed on Jul. 20, 2011, the benefit of priority of which is claimed hereby, and of which is incorporated by reference herein in their entireties.

BACKGROUND

The local atmospheric environment (i.e., air) contains a vast array of natural and man-made particles. These particles have a wide particle size distribution from being visible to the naked eye to sub-microscopic. Particle sizes described herein are generally defined by a given aerodynamic size, expressed in micrometers (i.e., microns (μm)) where one micron is one-one millionth of a meter or approximately 39.4 micro-inches (about 1/25,000 of an inch). Depending upon lighting and contrast conditions, visually detectable particles are approximately 50 microns or larger. The numbers of sub-micron particles in air is far greater than larger particles because of the mass of the particles, respectively. Settling velocities for small particles, in either still air or in an air stream (moving air), are far greater than large particles. An air stream can suspend smaller particles for longer periods of time than larger particles.

Heating, ventilation, and air conditioning (HVAC) systems are made of combinations of duct work, fans, heaters, coolers, humidifiers, and filters that condition and deliver the air to occupied spaces providing comfort or the necessary environment in which to complete certain tasks. HVAC systems are common in all building structures. In most parts of the world, regulations govern HVAC systems depending on the function of the space that is being serviced. For example, filtration systems for pharmaceutical manufacturers, hospitals, and high-tech manufacturers can be complicated and multi-staged and may require a particular filter efficiency for a given face velocity of air at an output of the filter. Frequently, the regulations may also require a particular minimum filter efficiency for a given particle size.

Multi-staged filtration systems are filters placed in series with the lowest efficiency filter placed first in the series and the highest efficiency filter placed last in the series. "Last in the series" means closest to an output of the multi-staged filtration systems, such as just before the airflow through the filters enters a filtered room. The series arrangement is an economical way of filtering air. The lower efficiency filter entraps the larger sized particle, passing the smaller sized particles to the next filter in the series, and so on. In this respect, a multi-staged filtration system can be analogized to a sieve (although particles much smaller than the space between filter media may still be trapped by diffusion mechanisms). Additionally, placing filters in series allows the lower efficiency filter to act as a pre-filter to the higher efficiency filter located next in the series. Thus, the lower efficiency filter can be changed more often, saving the next more expensive filter (as filter efficiency increases, the price also increases).

Hospitals, for example, may have a four-stage filtration system with filters placed in series and placed from low-efficiency to high-efficiency, such as may be found in a high-efficiency particulate air (HEPA) filter. The filtering media used are typically fibers comprised of paper-like material or fiberglass and are highly restrictive to airflow. HEPA filters function to trap particles through three mechanisms: interception, impaction, and diffusion. Particle interception occurs when particles in an airstream (i.e., airflow through the filter) come within one radius of the filter fibers and are trapped by the fibers. Particle impaction occurs when particles impact directly onto a fiber. Particle diffusion occurs as a result of a collision of particles with gas molecules and accounts for why particles much smaller than the space between filter fibers can be trapped on the fibers. Since, for a given airflow, particle diffusion occurs with increasing frequency as particle size become smaller (especially when particles are smaller than approximately 0.1 μm in size), HEPA filters are rated by the most penetrating particle size (MPPS). For a given face velocity of air exiting a HEPA filter, for example, about 37 meters per minute (approximately 120 feet per minute), the combination of these three filtering mechanisms means that 0.3 μm particles are the MPPS. Thus, HEPA filters are defined as 99.97% efficient on 0.3 μm particles.

However, as the filters become more efficient the media used to produce the filters becomes denser and, therefore, more restrictive to air flow. The restriction to air flow creates a pressure drop within the filter. The pressure drop increases as the filters become loaded with particles that the filters have trapped. To compensate for the pressure drop, medium-efficiency, high-efficiency, and HEPA filters are constructed in ways to increase the effective filtering area in a given face size. The filters are constructed using pleats and bag pockets to increase the effective filtering area (e.g., as measured in square centimeters or square feet) and thus reducing the resistance to air flow or pressure drop created by the filter. Reducing pressure drop and increasing filter life by increasing effective filter area of filter media is paramount to the efficient design, installation, and operation of any HVAC system because the higher pressure drop requires larger fans and motors and, consequently, increased electrical power to run the fans and motors.

The filtering media in HEPA filters are densely pleated to maximize filter volume and the media packs containing all the filter media are sealed into steel or wooden frames. Even with the dense pleating techniques used to produce HEPA filters, HEPA filters still have a high restriction to airflow as well as a high associated cost. For example, a HEPA filter can produce an initial pressure drop of 300 Pascal (approximately 2.25 millimeters of mercury or 1.2 inches of water) at a face velocity of 37 meters per minute.

Particles trapped on the HEPA filters tend to load on the incoming face (i.e., where the airflow enters the filter) of the filter, as opposed to a depth-loading lofted media. With lofted media, particles can enter the media and be captured within the maize of filter material that comprises lofted media filters. Consequently, the lofted media allows more air to enter the media and work its way through the filter. Additionally, HEPA filters are relatively heavy (e.g., about 18 kilograms each (approximately 40 pounds)), each and need a separate filter holding arrangement designed to hold and seal the filters in the air stream.

Filter holding arrangements that have been used in various industries in the past simply cannot accommodate the newest demands and regulations for filtered air applications. For example, in the case of the aerospace industry, a wall of filters required for painting aircraft can require filter holding arrangements covering substantially all wall surfaces of an airplane-hangar sized structure. Consequently, due to the newer regulations requiring HEPA filtration for paint booths, the aerospace and other painting industries are forced to completely rebuild the filter holding arrangements currently in use to meet the new regulations requiring HEPA filters. Additionally, new fans and motors powerful enough to create sufficient airflow through the HEPA filters are required. Therefore, what is needed is a filter that can be retrofit into existing filter holding arrangements, using existing fans and motors, and still meet advanced filtration requirements imposed by various governmental agencies.

BRIEF DESCRIPTION OF THE DRAWINGS

FIG. 2A shows a side elevation view of a filter holder monitoring frame that may be used with the filter wall of FIG. 1;

FIG. 2B shows an isometric view of a filter holder monitoring frame that may be used with the filter wall of FIG. 1;

FIG. 4B shows an example of an combination filter that may be used to comply with, for example, advanced exhaust pollution requirements and that further may be used with the filter wall of FIG. 1 or the monitoring frame of FIG. 2A or 2B;

FIGS. 9C through 9E show various views of the example combination filter of FIG. 9A.

DETAILED DESCRIPTION

Figure 1:
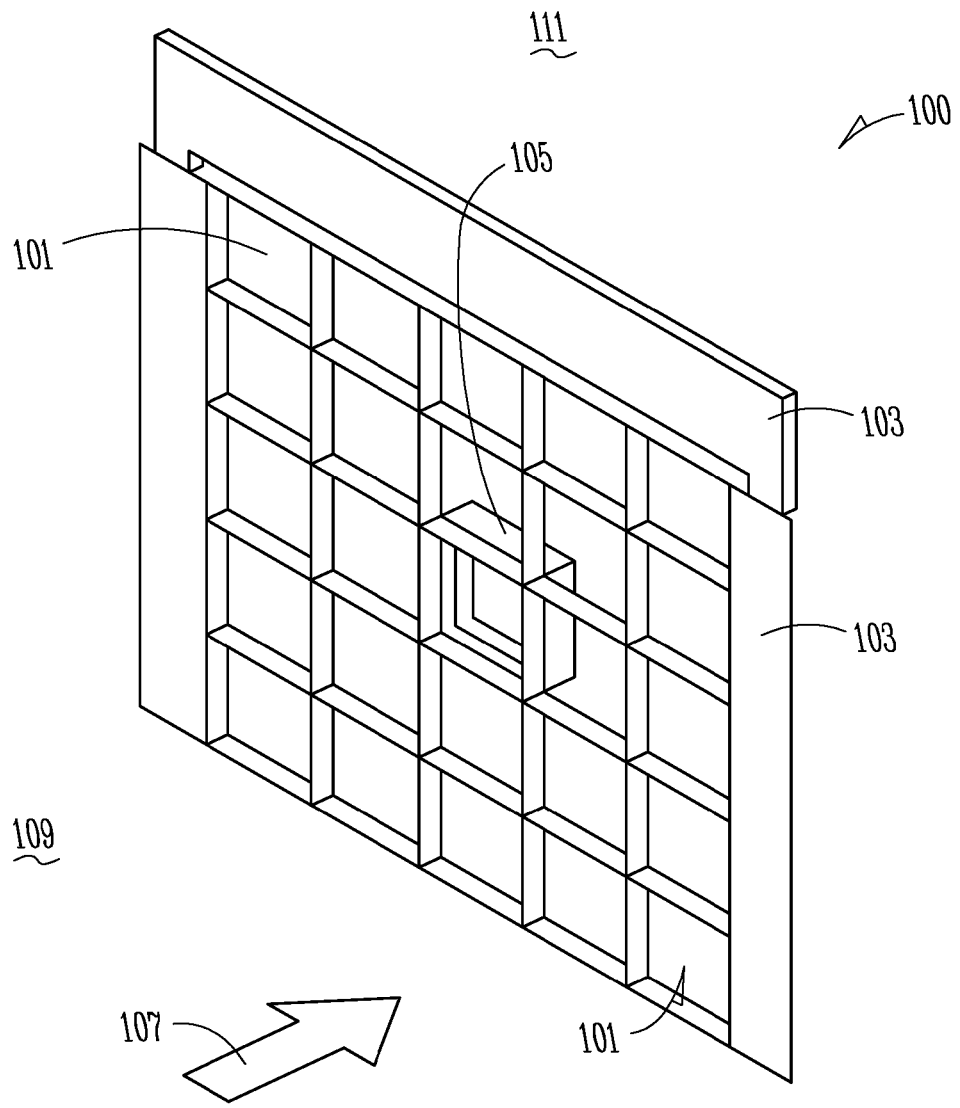
FIG. 1 shows a schematic representation of a filter wall used in paint booths in the aerospace and other industries in which paint booths are used.

The description that follows includes illustrative systems, methods, techniques, and fabrication sequences that embody at least portions of the inventive subject matter. In the following description, for purposes of explanation, numerous specific details are set forth in order to provide an understanding of various embodiments of the inventive subject matter. It will be evident, however, to those skilled in the art that various embodiments of the inventive subject matter may be practiced without these specific details. Further, well-known structures, methods, fabrication technologies, and techniques have not been shown in detail.

As used herein, the term "or" may be construed in an inclusive or exclusive sense. Similarly, the term "exemplary" is construed merely to mean an example of something or an exemplar and not necessarily a preferred or ideal means of accomplishing a mil. Additionally, although various exemplary embodiments discussed below focus on a combination filter for use in, for example, the industrial and aerospace painting industries, the embodiments are merely given for clarity in disclosure. As an introduction to the subject, a few embodiments will be described briefly and generally in the following paragraphs, and then a more detailed description, with reference to the figures, will ensue.

In various embodiments, a single-stage combination filter is provided that has a number of first layer media pockets and a number of second layer media pockets arranged downstream of the first layer pockets. An opening of each of the first layer media pockets is arranged in parallel with one another to receive an incoming airflow into the single-stage combination filter. Each of the second layer media pockets is at least 99.97% efficient at removing 0.3 micron and larger particles at a face velocity on the filter of about 37 meters per minute.

In another embodiment, a method of forming a combination filter is provided. The method includes cutting a first layer media material, cutting a second layer HEPA media material, and alternately interleaving the first layer media and the second layer HEPA media to form pairs of the first layer media and the second layer media. The pairs of the first layer media and the second layer media are then folded with the first layer media being arranged inside of the second layer HEPA media. Sides of the folded pairs of the first layer media and the second layer media are then sealed. A material is inserted into an open edge of the folded pairs of the first layer media and the second layer media, forming a pocket assembly. A number of the pocket assemblies is inserted in parallel to one another into a header assembly.

In another embodiment, a three-stage filter for use in the aerospace industry is provided. The three-stage filter includes a first-stage pre-filter, a second-stage medium-efficiency filter downstream of the first-stage pre-filter, and a third-stage combination filter downstream of the second-stage medium-efficiency filter. The third-stage combination filter has a number of first layer media pockets to receive an incoming airflow with a number of second layer HEPA media pockets downstream of the plurality of first layer media pockets.

Paint booths are rooms prepared with a specific purpose of creating an environment within for applying coating (e.g., paint) to a manufactured part. As noted above, a paint booth can be the size of an airplane hangar. However, the environment of the paint booth can still be controlled since it is a confined space. Generally, a paint booth contains two HVAC systems. One HVAC system is to supply fresh, conditioned air into the booth. The other HVAC system is to exhaust overspray air out of the booth. Overspray is paint (or other coatings) that did not adhere to the manufactured part being painted or coated.

For example, inside the booth, liquid paint is delivered to a paint gun where the paint is atomized and delivered through the gun in a fog or mist-like state. Some of the paint fog attaches to the part and some of the paint stays suspended in the air, thus creating overspray. The overspray is then exhausted out of the paint booth through a filtration system. As discussed in more detail, below, the paint fog of overspray contains a wide range of particle sizes and therefore multi-staged filtration systems are designed for these systems.

With reference to now to FIG. 1, a schematic representation of a filter wall 100 is shown that is used in paint booths in the aerospace and other industries in which paint booths are used. The filter wall 100 is shown to include a multi-stage filter holder frame 101, a number of filler strips 103 to fill spaces between the filter wall 100 and adjoining side walls (not shown), and an optional filter holder monitoring frame 105. An arrow 107 also indicates a direction of airflow. As indicated by the arrow 107, the direction of airflow is from an inside area 109 of the paint booth to an exhaust area 111. The exhaust area 111 may contain a plenum and ductwork (not shown) to direct filtered air out of the room or building housing the paint booth.

The multi-stage filter holder frame 101 can be fabricated to hold one or more filters of a particular size in series. For example, the multi-stage filter holder frame 101 may accommodate a standard sized filter having outside dimension of about 50.8 cm by 50.8 cm (approximately 20 inches by 20 inches) filter. The filler strips 103 may be arranged to fill in any space remaining between integral numbers of the filter holder frames and adjoining side walls and a ceiling of the paint booth.

Referring now to FIGS. 2A and 2B concurrently, the filter holder monitoring frame 105 that may be used with the filter wall of FIG. 1 is shown. The filter holder monitoring frame 105 of FIGS. 2A and 2B is arranged to hold a three-stage filter in series. With direct reference to the side elevational view of FIG. 2A, the filter holder monitoring frame 105 is shown to include a first area 201A for holding a first-stage filter 201B, a second area 203A for holding a second-stage filter 203B, and a third area 205A for holding a third-stage filter 205B.

Within the filter holder monitoring frame 105 of FIG. 2A, the first-stage filter 201B is a pre-filter and may be selected to be a low-efficiency flat pad filter. The second-stage filter 203B may be a medium-efficiency multi-layered panel. As shown in FIG. 2A and described in more detail below, the third-stage filter 205B is referred to in the industry as a multi-pocketed bag filter. The multi-pocketed bag filter hangs through and extends beyond the filter holder monitoring frame 105 and into the exhaust area 111 (FIG. 1) or a plenum (not shown) within the exhaust area 111.

Multi-pocketed bag filters are typically 30 cm (approximately 12 inches) to 50 cm (approximately 20 inches) in length from the frame of the bag filter to a trailing or downstream edge of the bags. Since the multi-pocketed bag filter is comprised of a number of individual pockets within the bag, an overall surface area presented to the airflow is much greater than an area of the filter holder monitoring frame 105 by itself. As a result of the increased surface area, the pressure drop through the bag filter is reduced as compared with a standard flat filter design. Construction of various embodiments of multi-pocketed bag filters is discussed in more detail, below.

The filter holder monitoring frame 105 of FIG. 2A is further shown to include a number of tube fittings 209 and a number of pressure gauges 207. The tube fittings 209 place the pressure gauges in direct fluid communication with pressure between the first area 201A, the second area 203A, and the third area 205A of the filter holder monitoring frame 105. Consequently, the pressure gauges 207 can monitor a pressure drop across each of the filters 201B, 203B, 205B. Since the pressure drop across each of the filters is being monitored, a user of the paint booth can readily determine when each of the filters is loaded with paint, as discussed above, and can change out one or more of the three filters as needed to ensure continued filtering efficiency without an excessive pressure drop across the filter.

For example, the center one of the pressure gauges 207 is in fluid communication, through two of the tube fittings 209, with the second area 203A and the third area 205A. Since the center one of the pressure gauges 207 measures an upstream pressure within the second area 203A and a downstream pressure in the third area 205A, the pressure gauge therefore measures the pressure drop across the second-stage filter 203B. Similarly, the first (i.e., the one on the left) of the pressure gauges 207 is in fluid communication with ambient pressure at a point 211 inside the paint booth and with the second area 203A through the first on the tube fittings 209 coupled to the second area 203A. Thus, the first of the pressure gauges 207 measures an upstream pressure at the point 211 within the paint booth and a downstream pressure in the second area 203A. The pressure gauge therefore measures the pressure drop across the first-stage filter 201B.

Within the United States, both Federal and state-level agencies, such as the Environmental Protection Agency (EPA), create regulations to control a level of filtration required on exhaust systems (e.g., within the exhaust area 111 of FIG. 1) of paint booths. These regulations can be different and more-or-less strict depending upon the paint formulation. For example, if the paint used contains chromates, the regulations are far more restrictive. The regulations may also establish the air velocity (e.g., a face velocity at a downstream side of the filter) and flow rates through the filters. For example, in the United States, the air velocity and air flow rate are defined in feet per minute (PPM) and cubic feet per minute (CFM), respectively.

Certain industries may use paints, such as chromate additives, comprised of more volatile chemicals for wear, durability, and adhesion purposes. Thus, more stringent regulations typically apply to these industries. For example, the aerospace industry uses many paint formulations which contain hazardous pollutants such as hexavalent chromium. To account for the more hazardous pollutants, on Sep. 1, 1995, the United States Environmental Protection Agency published the final aerospace National Emission Standards for Hazardous Air Pollutants (NESHAP, also referred to as EPA Test Method 319), published under 40 C.F.R. §63, Subpart GG. The rule regulates emissions of Hazardous Air Pollutants (HAP) from aerospace manufacturing and rework facilities (including maintenance and repair) that are a major source of HAP.

The NESHAP rule addresses the quality of the exhausted air from aerospace paint booths by establishing a test method and minimum efficiencies on a range of particle sizes of a wet and a dry filter challenge agent. In addition, the NESHAP rule requires a three-stage filtration system. Three-stage filtration systems are readily available from several filter manufacturers for this application.

Figure 3:
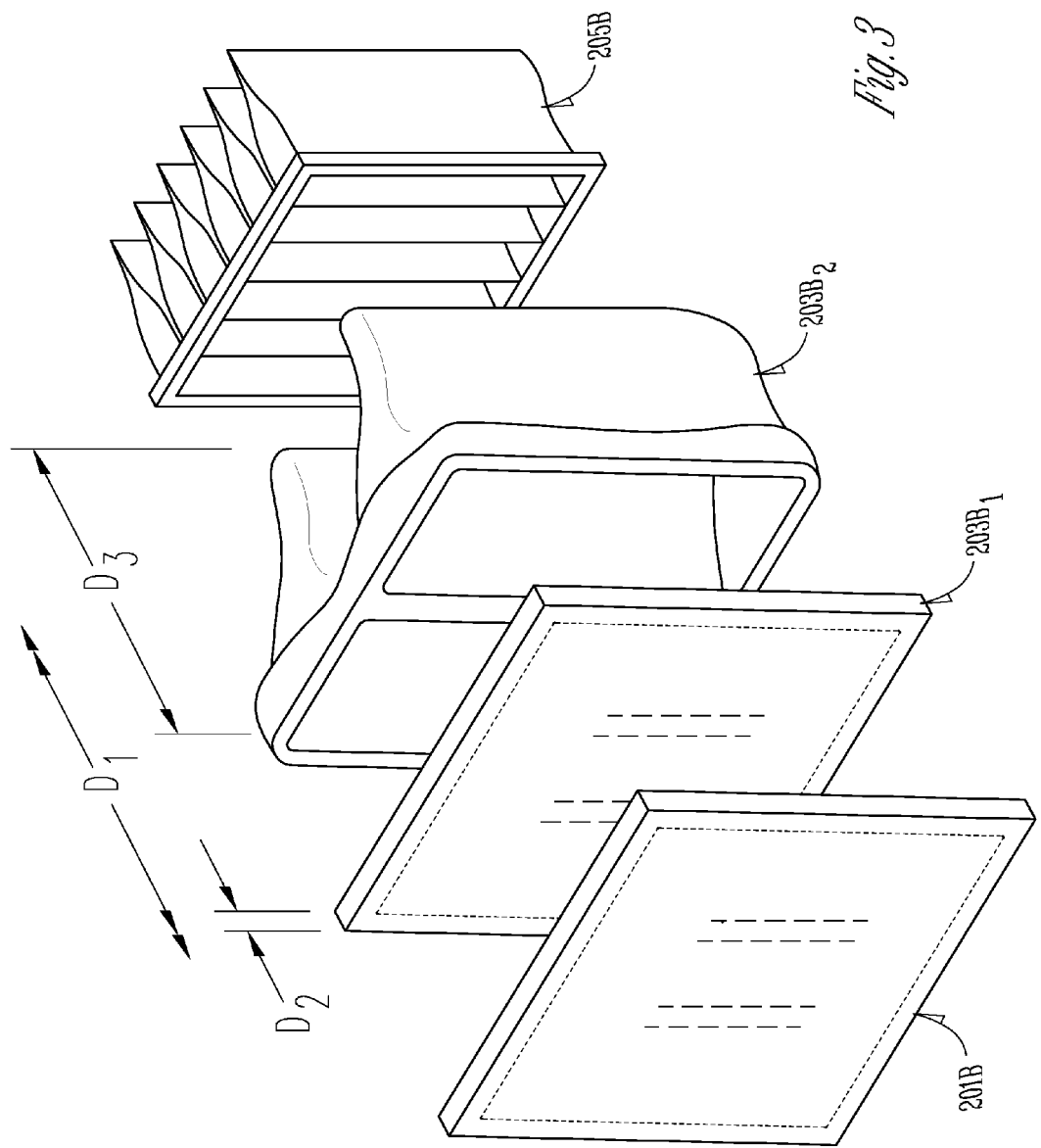
FIG. 3 shows an example of a three-stage filter system that may be used with the filter wall of FIG. 1 or the monitoring frame of FIG. 2A or 2B.

With reference now to FIG. 3, an example of a three-stage filter system that may be used with the filter wall of FIG. 1 or the monitoring frame of FIGS. 2A and 2B is shown. With the proper level of filtration at the required flow rate, the three-stage filter system of FIG. 3 may be in compliance with the NESHAP rule. Although four filters are shown, a skilled artisan will immediately recognize that second-stage filter 203B of FIG. 2A may be implemented by either a medium-efficiency flat filter $203B_1$ or, optionally, by a medium-efficiency bag filter $203B_2$ of FIG. 3. As indicated in FIG. 3, an overall depth $D_1$ of the three-stage filter system is dependent upon which filter is selected for the second stage. The medium-efficiency flat filter $203B_1$ has a depth of $D_2$ whereas the medium-efficiency bag filter $203B_2$ has a depth of $D_3$. Therefore, if the medium-efficiency bag filter $203B_2$ is selected as the second-stage filter, an overall depth $D_1$ of the three-stage filter system increases due to the increased depth (i.e., the difference of $D_3$-$D_2$) of the medium-efficiency bag filter 203$B_2$ since the medium-efficiency bag filter 203$B_2$ should not touch the third-stage filter 205B or the pressure drop across the third-stage filter 205B would otherwise increase. Each of the individual filter stages may use readily-available commercial filters as known independently to one of skill in the art.

In the United States, the State of California increased the stringency beyond what is required by the NESHAP rule. The California State EPA increased the final filtration requirement to HEPA filtration quality. This additional requirement for HEPA filtration quality generally means that an additional HEPA frame system must be installed behind the three-stage frame, discussed above, to hold and seal the added HEPA filters. In addition, as also discussed above, the increased pressure drop due to the HEPA filter requires an increase in motor power to operate against the increased pressure drop, larger fans to move the air, and increased electrical power to compensate for the increased resistance to air flow due to the higher pressure drop. Also the paint booths must be designed with a larger foot print to allow for the installation and maintenance of the HEPA filters. The HEPA requirement increases the initial cost, on-going maintenance, and on-going energy requirements needed to operate the paint booth with HEPA filters. These paint booths range in size from small, for manufactured parts, to paint booths large enough to accommodate full-sized aircraft.

Figure 4A:
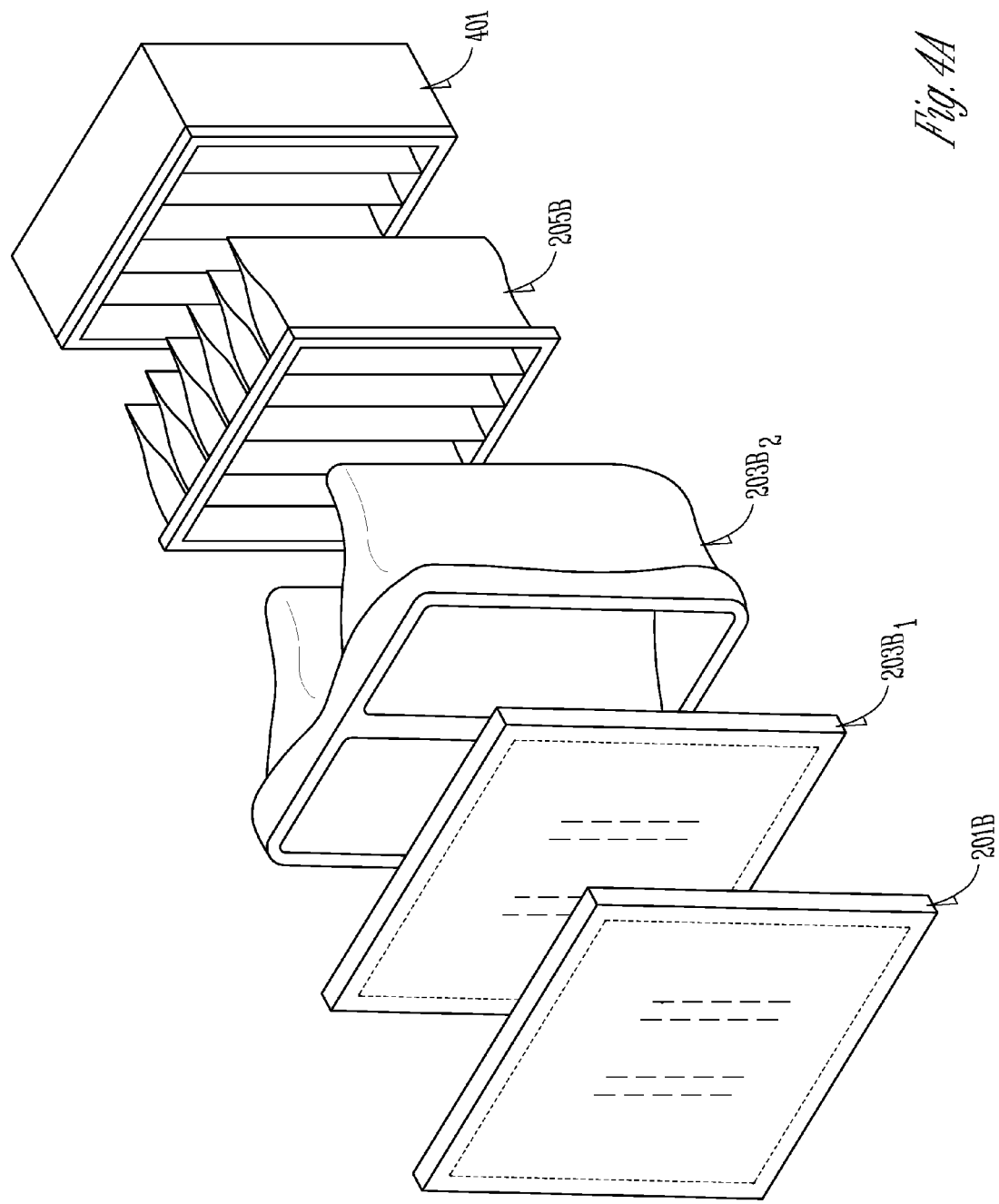
FIG. 4A shows an example of a four-stage filter system that may be used to comply with, for example, advanced exhaust pollution requirements.

FIG. 4A shows an example of a four-stage filter system that may be used to comply with, for example, advanced exhaust pollution requirements under the State of California rule. The four-stage filter system of FIG. 4A utilizes the same or similar design to the three-stage filter system of FIG. 3 but also incorporates a HEPA filter 401 as the final-stage in the system. The HEPA filter 401 may be, for example, a commercially available HEPA filter from a number of suppliers, such as MICROGUARD®, manufactured by AirGuard of Louisville, Ky., USA. However, as will be immediately recognizable to a person of skill in the art and as discussed above, the four-stage filter system of FIG. 4A cannot physically be implemented into existing paint booths due to the requirement for a fourth, and much larger, final stage filter—the HEPA filter 401.

Referring to FIG. 4B, an exemplary embodiment of an combination filter that may be used to comply with, for example, advanced exhaust pollution requirements and that further may be used with the filter wall of FIG. 1 or the monitoring frame of FIGS. 2A and 2B is shown. Although the combination filter of FIG. 4B appears similar to the three-stage filter system of FIG. 3, FIG. 4B is actually a four-stage filter system. A combination filter 431 effectively incorporates components from both the medium-efficiency bag filter 203$B_2$ of FIG. 3 and the HEPA filter 401 of FIG. 4B into a single-stage. Consequently, the combination filter 431 is a single-stage filter that meets the HEPA requirement under the State of California rules, has a form-factor to physically fit within the three-stage aerospace parameter required under NESHAP, and has a much lower initial pressure drop than standard HEPA filters.

In an embodiment, the combination filter 431 utilizes a combination of two layers of electrostatic media combined as if it were a single media. The first layer of material of the combination filter 431 is approximately 90% efficient and pre-filters the second layer. The first layer material may be an electrostatic media. Such an electrostatic media is commercially available from, for example, Kimberly Clark Corporation of Neenah, Wis., USA, and is referred to as "95 SP Filtration Media."

The second layer of the combination filter 431, which is approximately 99.97% efficient, is a lofted electrostatic HEPA filtration media and, in some embodiments, mechanically coupled to the first layer. One commercial source for the lofted electrostatic HEPA filtration media is available from Hollingsworth & Vose of Cumbria, England, UK, under the name TECHNOSTAT®. TECHNOSTAT® is a blended, nonwoven synthetic fiber attached to a polypropylene spun-bonded scrim.

To verify efficiency and loading characteristics of the combination filter 431, test samples were prepared for testing by LMS Technologies, Inc. (Edina, Minn., USA) in accordance with the EPA Test Method 319 testing guidelines. The combination of the two-layer electrostatic media allows the three-stage system of FIG. 4B to pass both the Federal NESHAP requirements and the HEPA emission requirements of the State of California with a single filter.

Figure 5:
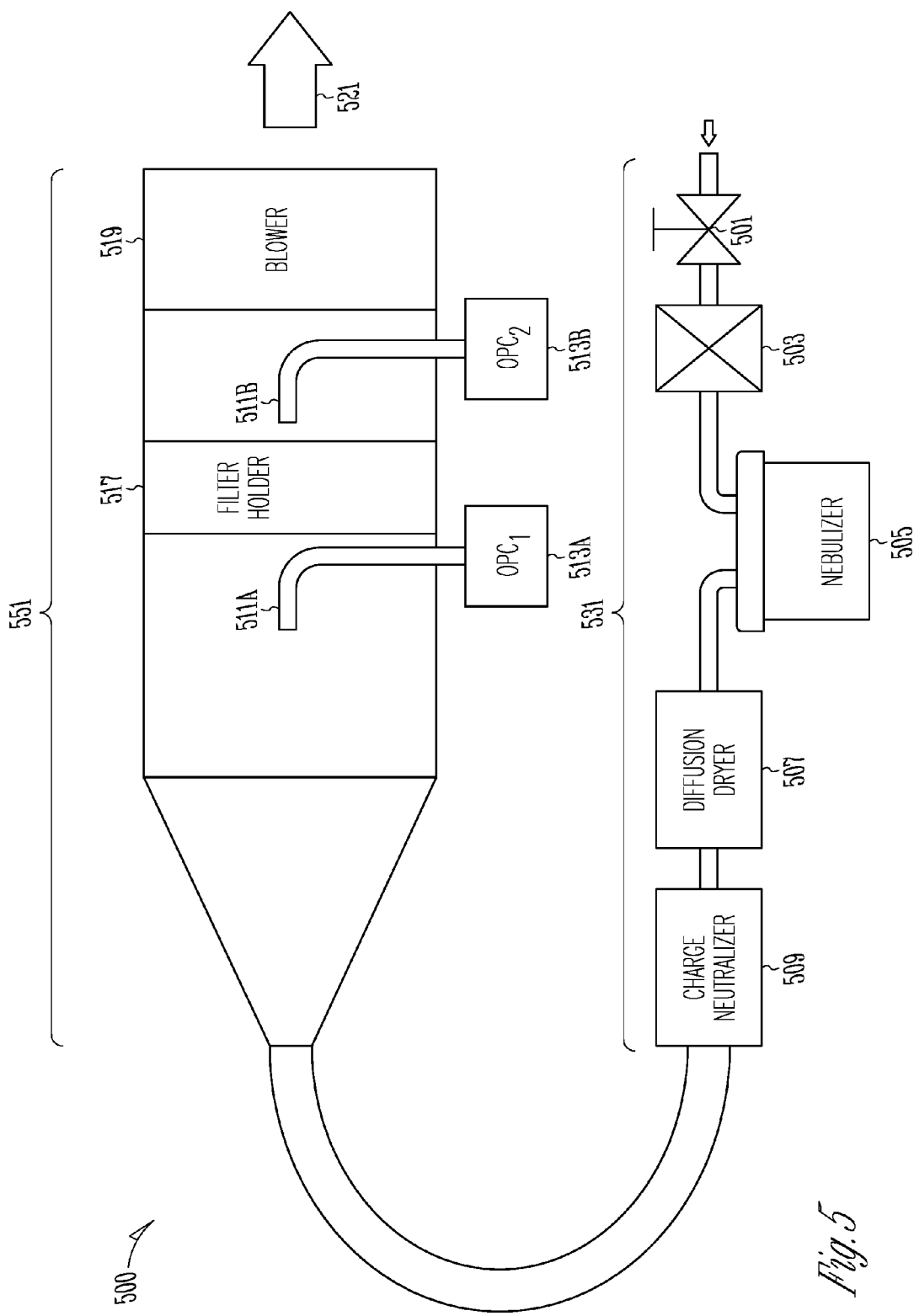
FIG. 5 is a schematic diagram of an example test apparatus used for testing filter efficiency.

FIG. 5 is a schematic diagram of an exemplary test apparatus 500 used for testing filter efficiency. The exemplary test apparatus 500 is shown to include a particle generation section 531 and a filter chamber test section 551. The particle generation section 531 includes a throttling valve 501, an absolute filter 503, a nebulizer 505, a diffusion dryer 507, and a charge neutralizer 509.

The throttling valve 501 may be, for example, a mechanical constrictive or obstructive pneumatic valve or, alternatively, a mass flow meter. The throttling valve 501 accepts and controls flow of a gas flow, such as clean dry air (CDA) or a bottled inert-gas, such as nitrogen. The gas flow is then filtered by the absolute filter 503 and enters the nebulizer 505. The nebulizer 505 may be any of a variety of commercially available nebulizers such as a Collison nebulizer. The nebulizer may contain a monodisperse solid particle in a colloidal suspension or various types of other challenge particles such as oleic acid or potassium chloride (KCl). Non-monodisperse particles may be filtered to a monodisperse and known size by various techniques known independently in the art (such as through a differential mobility analyzer, not shown). Alternatively, non-monodisperse particles may be generated and fed into the filter chamber test section 551. The particle counters of the filter chamber test section 551, discussed below, may then simply size the generated particles. Particles generated by the nebulizer are then dried by the diffusion dryer 507. The diffusion dryer 507 may be, for example, a tube for air and particle flow surrounded by a desiccant drying material. Excess charge on the particles produced by the nebulization process is removed by the charge neutralizer 509, thereby reducing agglomeration of the particles. In some embodiments, the charge neutralizer 509 may include a chamber with one or more Kr-85 or Po-210 beta-emitter sources.

The filter chamber test section 551 includes an upstream optical particle counter 513A and a downstream optical particle counter 513B. The optical particle counters can be any of a variety of particle counters known independently in the art including, for example, a laser particle counter or a condensation nucleus counter. The upstream optical particle counter 513A samples particles produced by the particle generation section 531 and entering the filter chamber test section 551 through an upstream sampling probe 511A. A filter placed in the filter holder 517 filters at least a portion of the generated particles. Particles penetrating through the filter are sampled by downstream sampling probe 511B in direct fluid communication with the downstream optical particle counter 513B. Certain types of particle counters can also be used to size upstream and downstream particles.

Using data collected from the exemplary test apparatus 500, a fractional efficiency of the filter under test can be calculated by the following equation $$F_{eff} = \frac{C_{up} - C_{down}}{C_{up}} \cdot 100\%$$

where $F_{eff}$ is the fractional efficiency of the filter as a function of particle size (in microns), $C_{up}$ is the concentration per unit volume of particles collected upstream of the filter under test, and $C_{down}$ is the concentration per unit volume of particles collected downstream of the filter under test.

Figure 6:
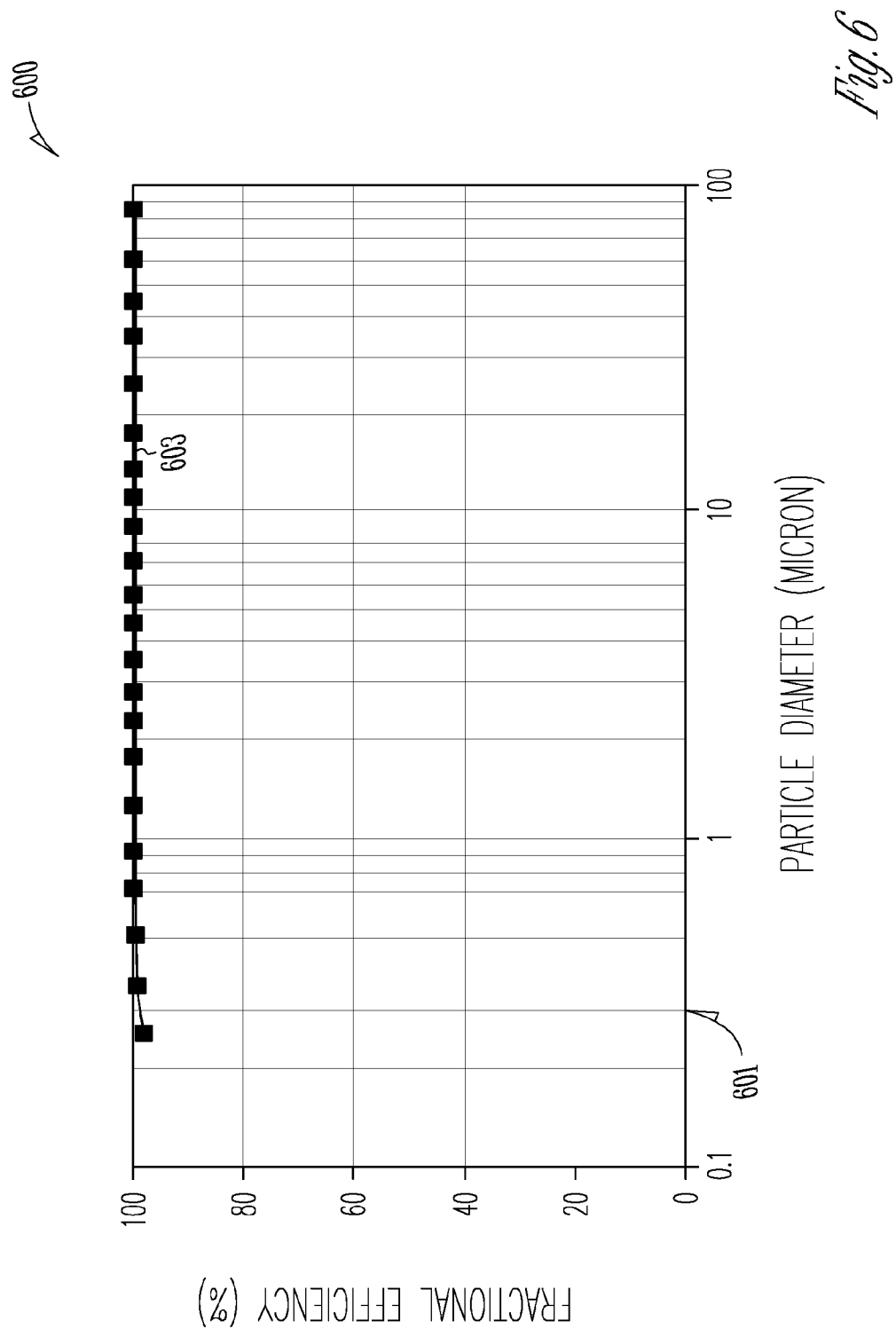
FIG. 6 is an example graph showing fractional efficiency as a function of particle diameter in testing the combination filter of FIG. 4B.

FIG. 6 is an exemplary graph 600 showing fractional efficiency as a function of particle diameter in testing the combination filter 431 of FIG. 4B. The graph plots efficiency 603 of the filter under test (from FIG. 5) for a number of different particle diameters 601. The lowest efficiency indicated by the underlying data used to produce the exemplary graph 600 is 99.99%. Thus, the combination filter 431 (FIG. 4B) passes the stringent requirements established both under NESHAP and the State of California HEPA filter requirement for challenge particles.

In addition to filter efficiency, NESHAP also requires that a filter be tested for pressure drop as the filter becomes loaded with paint. In a further test conducted by LMS Technologies, Inc., paint was fed into sample filters to determine pressure drop as a function of mass of paint fed. Table 1, below, describes parameters used to produce the pressure drop test on a test filter.

TABLE I

| | |
|---|---|
| FILTER DESCRIPTION | 20" × 20" FILTER CONSISTING OF 1" POLY PAD FIRST STAGE, POLY PANEL SECOND-STAGE, AND SIX POCKET BAG COMBINATION FILTER THIRD-STAGE |
| PAINT MATERIAL | DEFT TWO PART 44-GN-72 CHROMATE CORROSION INHIBITOR |
| PAINT SPRAY METHOD | CONVENTIONAL AIR GUN AT 45 PSIG |
| SPRAY FEED RATE | 106 GRAMS PER MINUTE; 100 $CM^3$ PER MINUTE |
| AIR VELOCITY | 120 FEET PER MINUTE FACE VELOCITY THROUGH FILTER |

Table II below, presents results from the pressure drop test regarding spray removal efficiency and paint holding capacity of the test filter.

TABLE II

| | |
|---|---|
| INITIAL PRESSURE DROP OF THE THREE-STAGE FILTER SYSTEM | 0.355 INCHES OF WATER |
| FINAL PRESSURE DROP OF THE LOADED FILTER SYSTEM | 0.979 INCHES OF WATER |
| PAINT HOLDING CAPACITY OF FIRST FILTER | 910 GRAMS |
| INITIAL REMOVAL EFFICIENCY OF ALL THREE-STAGES | 99.999% (PAINT PENETRATION = 0.0 GRAMS) |
| AVERAGE REMOVAL EFFICIENCY OF ALL THREE-STAGES | 99.999% (PAINT PENETRATION = 0.0 GRAMS) |
| FIRST-STAGE PRESSURE DROP AND GAIN IN MASS | 0.650 INCHES OF WATER; 910 GRAMS |
| SECOND-STAGE PRESSURE DROP AND GAIN IN MASS | 1.07 INCHES OF WATER; 730 GRAMS |
| THIRD-STAGE PRESSURE DROP AND GAIN IN MASS | 1.26 INCHES OF WATER; 509 GRAMS |

Figure 7:
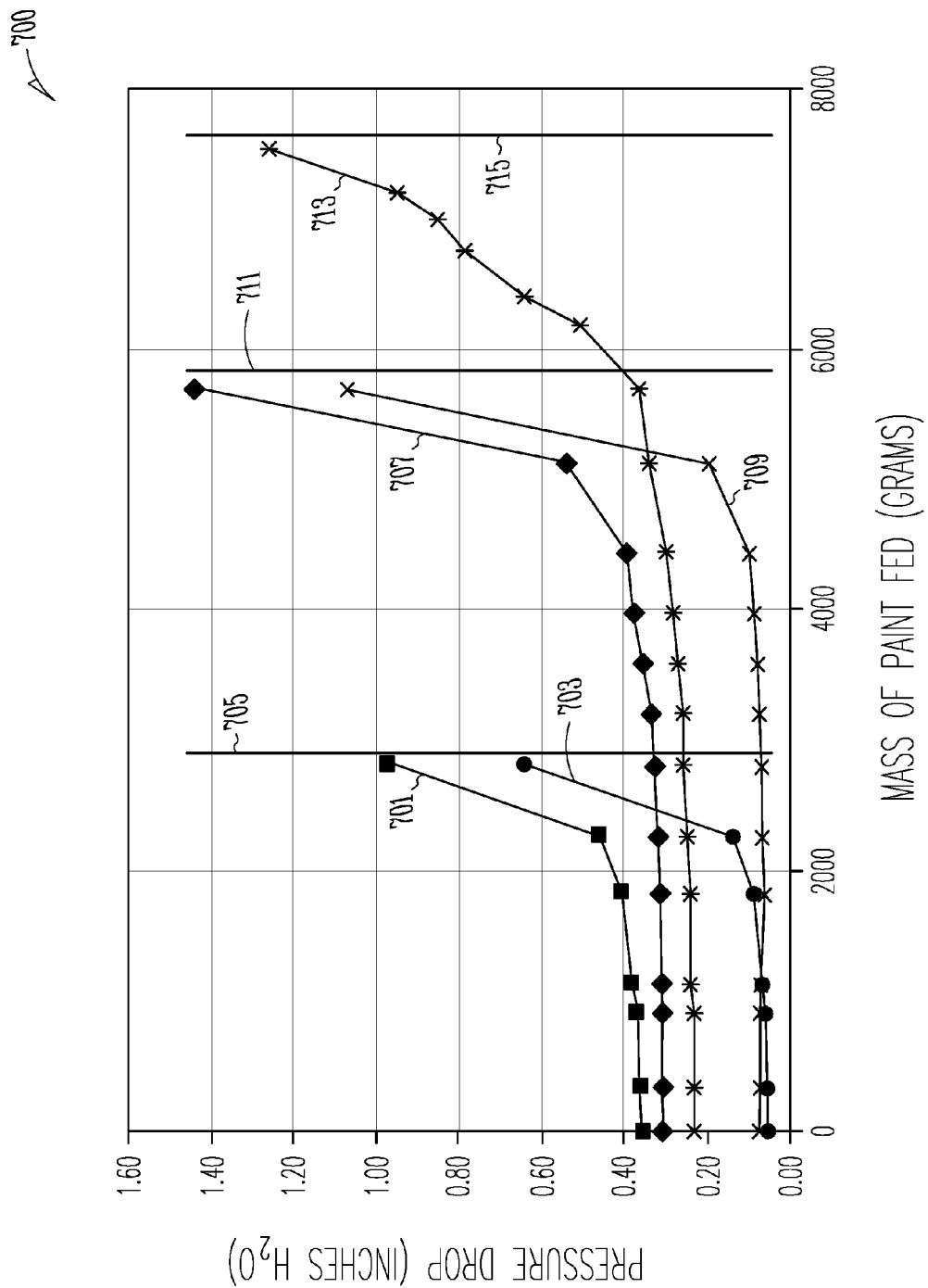
FIG. 7 is an example graph showing pressure drop as a function of mass of paint in testing the combination filter of FIG. 4B.

FIG. 7 is an exemplary graph 700 showing pressure drop as a function of mass of paint in testing the combination filter 431 of FIG. 4B. Plot 703 indicates pressure drop as a function of mass of paint fed on the first-stage filter, plot 709 indicates pressure drop as a function of mass of paint fed on the second-stage filter, and plot 713 indicates pressure drop as a function of mass of paint fed on the third-stage filter. The final point indicated on each of these three plots correlates with the tabular results of Table II. The final point on each of these three plots also provides a point when each of the individual filters is ready for replacement.

Being closest to the output of the spray gun, the first-stage filter loaded with paint the fastest. Thus, after the first-stage filter was fully loaded, the first-stage filter was removed at point 705 in the test with over 2800 grams of paint being fed (corresponding to the final loading of 910 grams of overspray loaded onto the first-stage filter). At that point in the test, plot 701 indicates that the total pressure drop measured across all three filters was less than 1 inch of water. After the second-stage filter was fully loaded, the second-stage filter was removed at point 711 in the test with over 5800 grams of paint being fed (corresponding to the final loading of 730 grams loaded onto the second-stage filter). At that point in the test, plot 707 indicates that the total pressure drop measured across the last two stages of the filter system was over 1.4 inches of water. The third-stage filter was fully loaded at point 715 in the test with over 7600 total grams of paint being fed (corresponding to the final loading of 509 grams loaded onto the filter). At that point in the test, plot 713 indicates that the total pressure drop measured across the final filter was approximately 1.26 inches of water.

Figure 8:
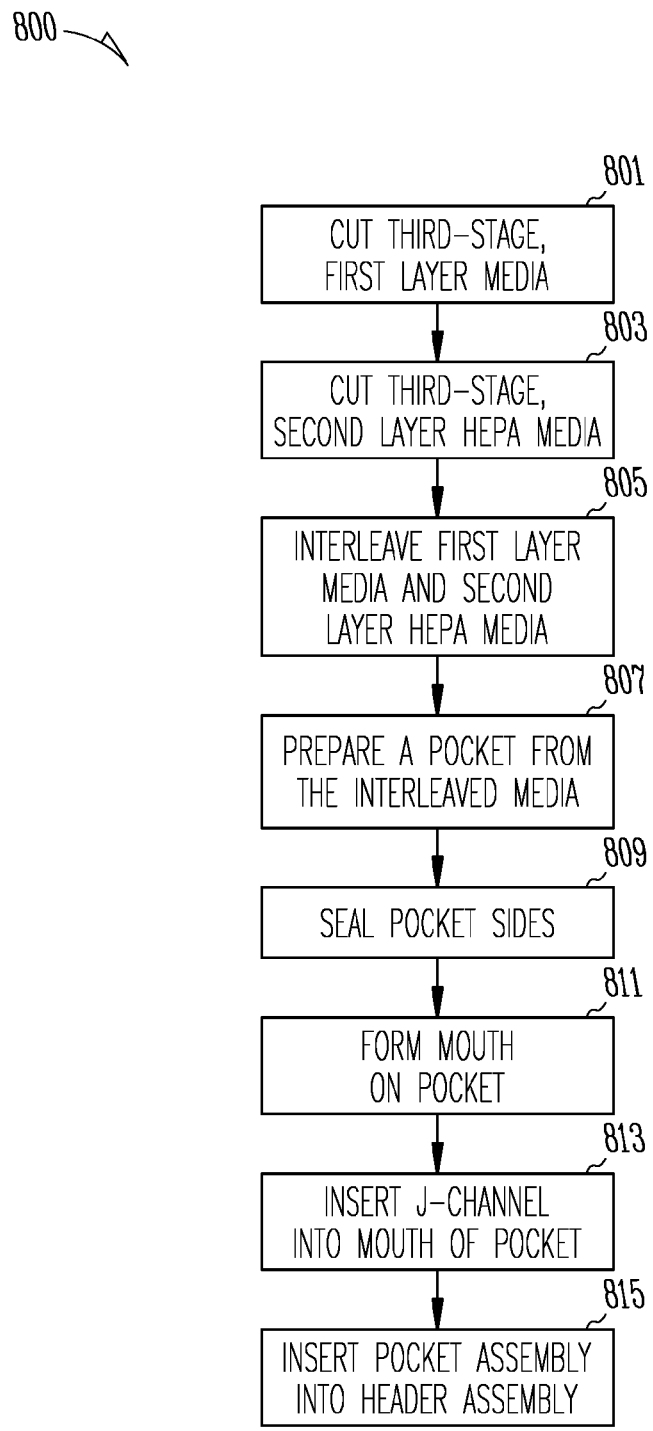
FIG. 8 is an example method for constructing the combination filter of FIG. 4B.

With reference to FIG. 8, an exemplary method 800 for constructing the combination filter 431 of FIG. 4B is shown. In operation 801, a first layer media for the third-stage of the three-stage filter is cut to length. The first layer media may be, for example, the Kimberly Clark 95 SP media, described above. The second layer HEPA media for the third-stage is cut to approximately the same length as the first layer in operation 803. The second layer media may be, for example, the Hollingsworth & Vose TECHNOSTAT® media, described above. Each of the first layer media and the second layer HEPA media are interleaved (e.g., stacked layers with each layer consisting of the first layer media and the second layer HEPA media) in operation 805. The layer of interleaved media is then formed into a pocket in operation 807 with the first layer media arranged inside of the second layer HEPA media. That is, in an exemplary embodiment, the first layer media is arranged to be upstream of the second layer HEPA media once the final version of the combination filter 431 (FIG. 4B) is formed and placed into the filter wall 100 of FIG. 1. The pocket may be formed by adding a single fold to the two layers of media (i.e., the interleaved first and second layers) such that the first layer media is inside the second layer HEPA media after the fold is made. A cross-sectional view of the interleaved media is shown and discussed in more detail with reference to FIG. 9B, below. Sides of the pocket are then sealed, sewn, glued, or otherwise adhered in operation 809. Sealing the sides of the pocket is performed to prevent airflow from escaping out the sides of the formed pocket. A side opposite the fold is left open to conduct airflow. As will be readily understandable to a skilled artisan, the formed pocket can be likened to a pillow case or other bag with the open portion of the pillow case or bag eventually positioned in the completed filter to face toward the incoming airflow.

In operation 811, a mouth is formed on the open side of the pocket to accept a rigid or semi-rigid device to keep the pocket open. One such device is a metallic J-channel frame, formed into a rectangle, to be placed within the mouth of the formed to pocket so as to keep the formed pocket open to an incoming airflow. J-channels are known independently in the art. Other types and shapes of channels are also known independently in the art and may be formed from plastic or other rigid or semi-rigid materials. The J-channel frame is inserted into the mouth formed on the pocket opening in operation 813. The J-channel frame is shown and discussed in more detail with reference to FIG. 9B, below A number of pocket assemblies (i.e., the two-layer pocket with the J-channel frame inserted into the mouth of each pocket) may then be inserted, adjacent and parallel to one another, into a header assembly in operation 815. The header assembly may be formed as a square or rectangle from a U-channel arranged such that the open portion of the "U" faces inward to accept the J-channel frames. The U-channel may be formed from materials similar or dissimilar from the J-channel. Also, although this exemplary embodiment describes a U-channel for ready understanding of the concepts described, a number of other cross-section other than a "U" shape may be utilized including flat, square, round, or other geometrical shapes.

Each of the adjacent pocket assemblies are then stapled, glued, or otherwise adhered to one another and to the header assembly. Since the J-channel frame is inserted into the pocket, an upper edge of the formed mouth and J-channel frame of each pocket presses against an adjoining formed mouth and J-channel frame to prevent airflow from being conducted between the individual pocket assemblies (i.e., adjacent pockets will not allow air to pass therebetween). In a specific exemplary embodiment, six pocket assemblies are used in a header assembly to complete the combination filter 431 of FIG. 4B.

Figure 9A:
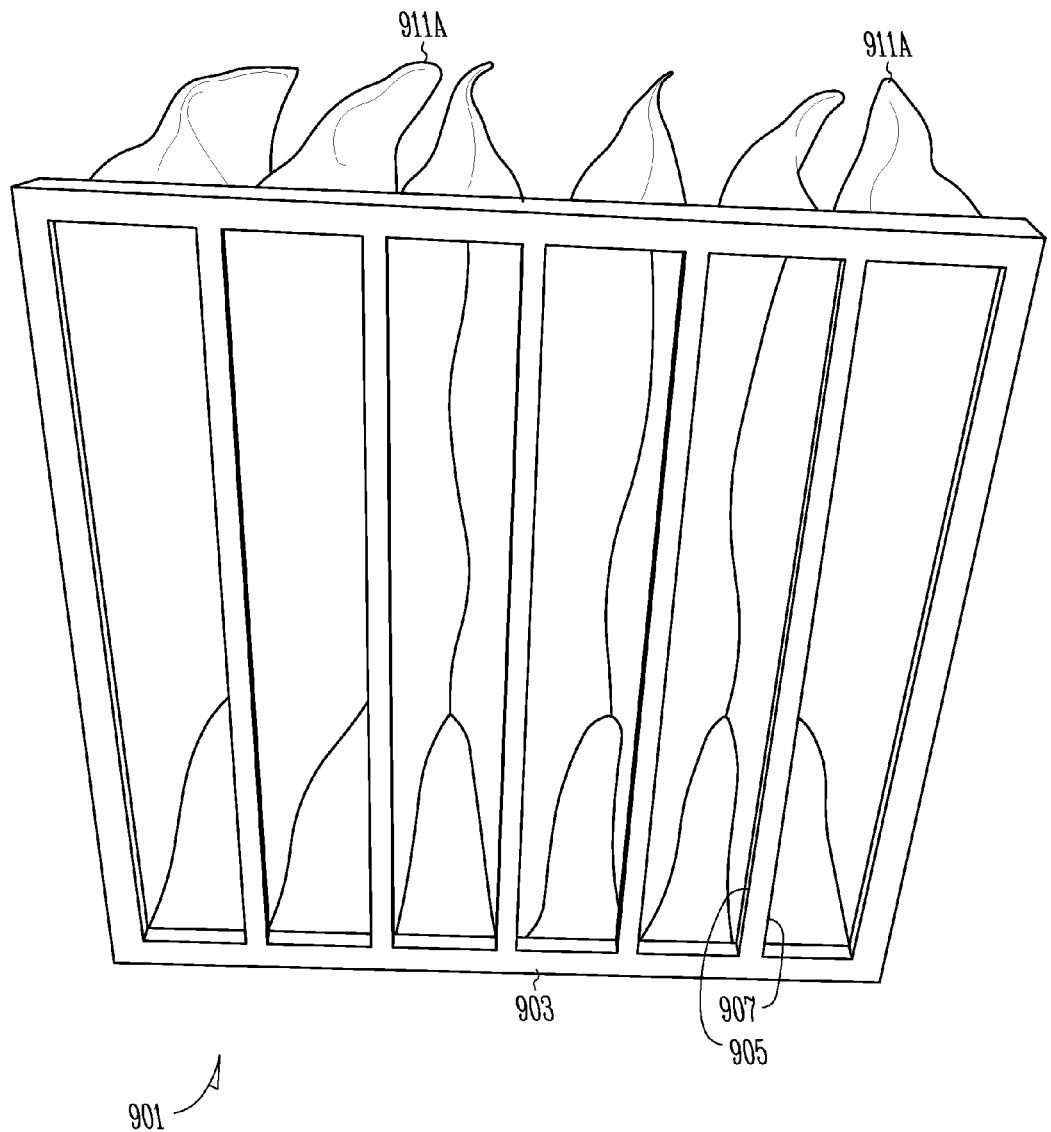
FIG. 9A shows a front elevational view of the combination filter constructed in accordance with the method of FIG. 8.

FIG. 9A shows a front elevational view 901 of a combination filter constructed in accordance with the method of FIG. 8. The front elevational view is shown to include a header assembly 903, a first rectangular j-channel frame 905, a second adjoining rectangular J-channel frame 907, and a number of formed pockets 911A. Each of the formed pockets 911A is individually coupled to a respective rectangular J-channel frame.

In a specific exemplary embodiment, the header assembly 903 is a square, metallic frame with outside dimensions of about 50.8 cm by 50.8 cm by 1.9 (approximately 20 inches by 20 inches by 0.75 inches). Each of the J-channel frames is about 50 cm by 7.3 cm by 1.6 (approximately 19.75 inches by 2.75 inches by 0.625 inches). These dimensions are exemplary only and other dimensions and numbers of J-channel frames may be used.

Figure 9B:
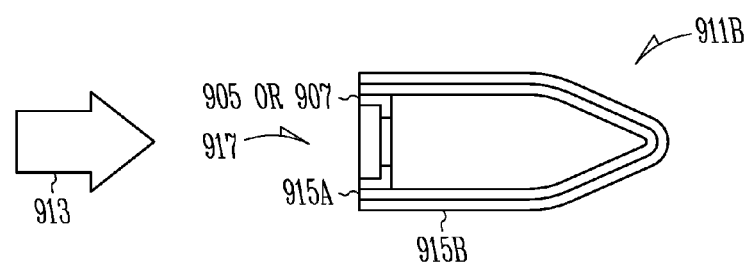
FIG. 9B shows an example cross-sectional view of one of the pockets of the combination filter of FIG. 9A.

FIG. 9B shows an example cross-sectional view of one of a pocket assembly 911B of the combination filter of FIG. 9A. The pocket assembly 911B comprises a first media layer 915A and a second layer HEPA media layer 915B. A direction of airflow is indicated by an arrow 913 showing the airflow entering the mouth 917 of the pocket assembly 911B.

In an example, the formed pockets 911 of FIG. 9A may be formed in different ways. For example, with reference to FIG. 9C, a rear view of a six inflated pockets 931 are shown. The inflated pockets 931 occur when airflow is directed through a pocket due to the air resistance encountered by the airflow through each of the pockets. An airflow indicator 935 shows the direction of airflow. In FIG. 9C, the direction of the airflow is out of the paper (i.e., toward the viewer). Each of the six inflated pockets 931 cause adjacent ones of the pockets to touch one another, forming a contact region 933 between the adjacent pockets. The contact region 933 restricts airflow. Therefore, much of the surface area of the pocket is blocked by the adjacent pocket (including pockets from adjacent filters (not shown), both above and below the six inflated pockets 931. Consequently, since adjacent pockets restrict the airflow due to the contact region 933, most of the airflow exiting the pockets can only be exhausted through an end (i.e., downstream) portion of the pocket.

With reference to FIG. 9D, a rear view of six modified pockets 951 is shown. In FIG. 9E, a side view of the six modified pockets 951 is shown (although only one of the six pockets can be seen from a side view). Also, in FIG. 9D, the airflow indicator 935 shows the airflow coming out of the paper, as with FIG. 9C. In FIG. 9E, the airflow indicator 935 shows the airflow coming from the left into the six modified pockets 951.

With reference to FIGS. 9D and 9E concurrently, a bonded portion 955 on each of the six modified pockets 951 reduces a likelihood of adjacent pockets touching one another. The bonded portion 955 is formed on a downstream region of each of the six modified pockets 951 and formed substantially parallel to a direction of the airflow. A reduced contact region 953 is seen to leave more open area between adjacent pockets than the contact region 933 of FIG. 9C. Since the contact region is reduced, airflow can exhaust through at least portions of the side of each pocket as well as the respective ends of the pockets. Consequently, the pressure drop across the pockets (in parallel to the airflow) is less than the six inflated pockets 931 of FIG. 9C due to the increased area through which airflow may be exhausted. As shown in FIG. 9D, at least a portion of the six modified pockets 951 is shown touching an adjacent pocket. However, depending upon a length and a number of bonded portions used, the pockets may be arranged to not touch during filter operation, thereby further reducing airflow restrictions. In other examples, the bonded portion 955 may only be applied to certain ones of the pockets. For example, the bonded portion 955 may only be applied to every other pocket.

The bonded portion 955 is formed by, for example, sewing the pockets so as to secure a first face of the second layer HEPA media to an opposing side of the second layer HEPA media (i.e., from a proximal side to a distal side of the pocket). Alternatively, a radio-frequency (RF) sealing or sonic welding process may be used. In a specific exemplary embodiment, a length (i.e., from the open portion of the pocket to an opposing end portion, defining a depth of the pocket) of the bonded portion 955 may be from about 10 cm (approximately 4 inches) to about 15 cm (approximately 6 inches). Depending on depth of the pocket, the bonded portion 955 may be shorter or longer and may be expressed as a percentage of the pocket depth. For example, the bonded portion 955 may be from about 25% to 75% of the pocket depth. An exact percentage will be at least partially dependent on an opening width of the pocket on the open end or mouth of the pocket—if the opening width is narrower, the bonded portion 955 can extend closer to the open end without restricting inlet airflow by not allowing the pocket to open to its full width. In other embodiments, two of more bonded portion may be formed on each pocket. The number of bonded portion formed on each pocket will be at least partially dependent upon a size of the filter. For example, a larger filter (e.g., 61 cm by 61 cm or approximately 24 inches by 24 inches) may be formed with pockets approximately 61 cm across. A smaller filter of 50.8 cm square may be formed with pockets of approximately 50.8 cm across. The larger 61 cm wide pockets can accommodate and may benefit (e.g., in reduced pressure drop) from more bonded portion than the smaller 50.8 cm pockets.

Figure 10A:
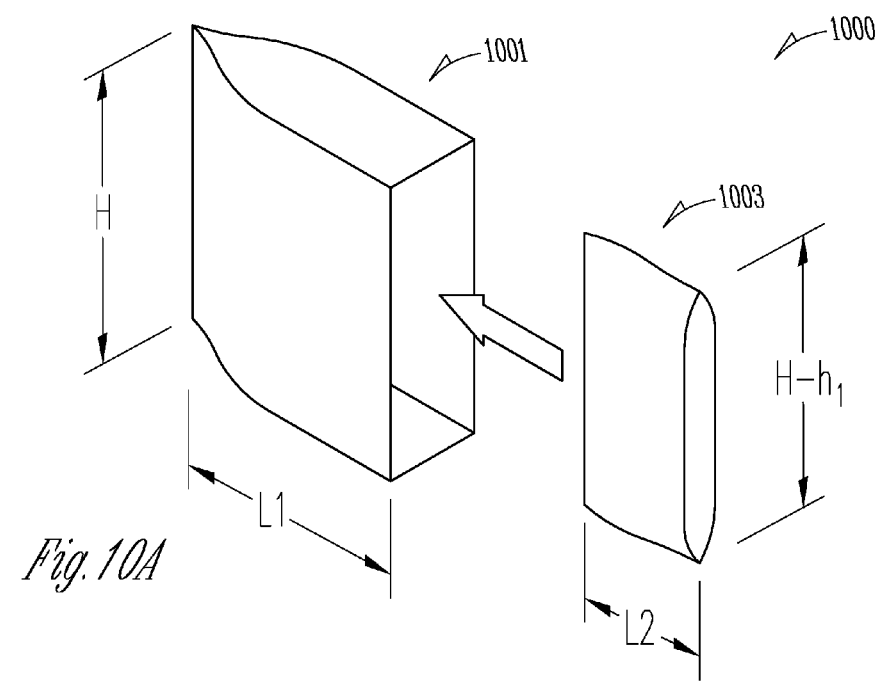
FIGS. 10A and 10B show example alternative fabrication techniques for constructing the filter of FIG. 9A.
Figure 10B:
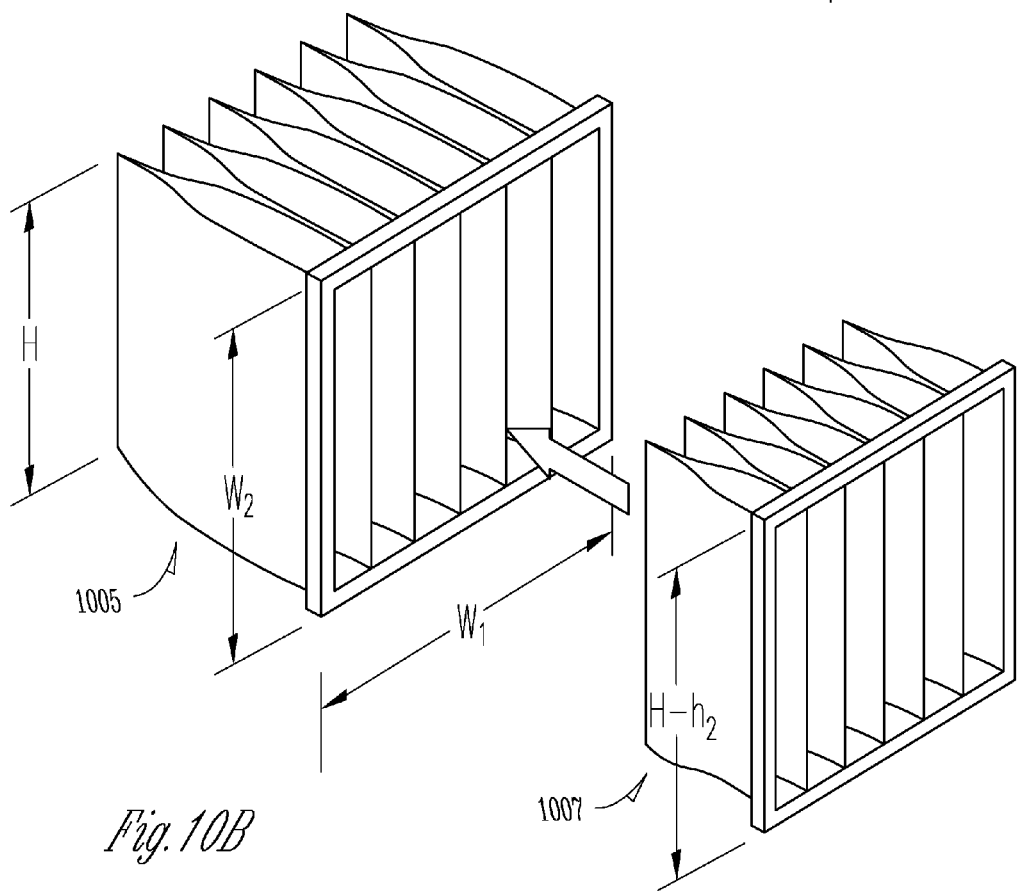

FIGS. 10A and 10B show exemplary alternative fabrication techniques for constructing the filter of FIG. 9A. For example, rather than forming the pockets as a single-folded unit as discussed with reference to the exemplary method 800 of FIG. 8, a single first layer media pocket 1003 of FIG. 10A can be formed to fit within a single second layer HEPA media pocket 1001. By forming each of the two layers of media separately, either media can be replaced, in the field, independent of the other. For example, if one or more of the single first layer media pocket 1003 becomes clogged with paint (perhaps due to a proximity to a paint spray gun), the media can be changed out independently without having to replace the entire filter.

A height, $H-h_1$, of the single first layer media pocket 1003 may be slightly less than a height, H, of the single second layer HEPA media pocket 1001 to allow easy insertion of the first pocket into the second pocket. Similarly, a length $L_2$, of the single first layer media pocket 1003 may be slightly less than a length, $L_1$, of the single second layer HEPA media pocket 1001. After inserting the first pocket into the second pocket, each of the media pockets may be adhered to one another in manners similar to those described above such as by, for example, stapling, gluing, RF sealing, sonic welding, or a number of other techniques, known independently in the art.

With reference now to FIG. 10B, an array of first layer media pockets 1007 may be constructed to be inserted into an array of second layer media pockets 1005. As with the single pockets just discussed, a skilled artisan will readily understand how to determine width and length dimensions to allow one unit to be inserted in the other. Also, an end-user can simply order replacement ones of the first layer media pockets 1007 or the array of second layer media pockets 1005 simply based on stating a first width $W_1$ and a second width $W_2$ of the filter size. Although not shown in either FIG. 10A or 10B, a skilled artisan, upon reading the disclosure presented herein, will realize that after the single first layer media pocket 1003 or the array of first layer media pockets 1007 is inserted into the respective pockets, a bonded portion, discussed above with reference to FIG. 9E, may be added to one or more of the pockets.

As discussed herein, various rules govern filter testing and requirements for paint overspray arrestance. Many of these test and rules are specific for a given industry. For example, paint overspray arrestance in the aerospace industry may be more stringent than other industries due to the use of, for example, chromated paints. Also, the rules can vary by governmental enforcement. As noted, the Federal Rules in the United States for paint overspray arrestance are less stringent than rules in the State of California directed to the same purpose.

One of the benefits of various embodiments of the combination filter discussed herein is that the pressure drop or resistance to air flow is substantially lower than a HEPA filter. Further, the combination filter discussed herein combines the third and fourth stages of a filter designed to comply with rules in the State of California. Therefore, the various embodiments of the can be readily retrofit into existing filter wall systems without need to rebuild structures or increase fan size and motor horsepower requirements.

Further, filter replacement costs are lowered using the various embodiments of the combination filter discussed herein because the filter is less expensive and weighs less than would be required by a standard third- and fourth-stage filter currently used.

The above description and the drawings illustrate some embodiments of the inventive subject matter to enable those skilled in the art to practice the various embodiments described. Other embodiments may incorporate structural, process, or other changes. Examples merely typify possible variations. Portions and features of some embodiments may be included in, or substituted for, those of others. Many other embodiments will be apparent to those of ordinary skill in the art upon reading and understanding the description provided herein. Consequently, in the foregoing Detailed Description, a skilled artisan may recognize that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A method of forming a combination filter, the method comprising:
   cutting a first layer media material;
   cutting a second layer high-efficiency particulate air (HEPA) media material;
   alternately interleaving the first layer media material and the second layer HEPA media material to form a pair of the first layer media material and the second layer HEPA media material;
   folding the pair of the first layer media material and the second layer HEPA media material with the first layer media material being arranged inside of the second layer HEPA media material;
   sealing sides of the folded pair of the first layer media material and the second layer HEPA media material;
   forming a bonded portion on at least a portion of a side face of the folded pair;
   inserting a rigid material into an open edge of the folded pair of the first layer media material and the second layer HEPA media material, thus forming a pocket assembly; and
   inserting a plurality of the pocket assemblies in parallel to one another into a header assembly, the bonded portion to reduce a likelihood of adjacent ones of the plurality of the pocket assemblies touching one another.

2. The method of claim 1, further comprising selecting dimensions of the combination filter to have a form-factor to fit into a standard filter wall as used in the painting industry.

3. The method of claim 1, further comprising selecting the first layer media material and the second layer HEPA media material to have a combined initial pressure drop of about 60 Pascal at a face velocity of about 37 meters per minute.

4. The method of claim 1, further comprising forming the bonded portion on a downstream region of the folded pair.

5. The method of claim 1, further comprising forming the bonded portion to be substantially parallel to a direction of an input airflow.

6. The method of claim 1, further comprising forming each of the plurality of the pocket assemblies as individual pockets folded with edges of each of the pockets sealed to one another.

* * * * *

UNITED STATES PATENT AND TRADEMARK OFFICE
CERTIFICATE OF CORRECTION

PATENT NO. : 9,873,075 B2
APPLICATION NO. : 15/087645
DATED : January 23, 2018
INVENTOR(S) : James R. Dralle Page 1 of 1

It is certified that error appears in the above-identified patent and that said Letters Patent is hereby corrected as shown below:

On page 2, in Column 1, under "Other Publications", Line 13, delete "fled" and insert --filed-- therefor Signed and Sealed this
Fourth Day of June, 2019

Andrei Iancu
*Director of the United States Patent and Trademark Office*